US007191698B2

(12) United States Patent
Bond et al.

(10) Patent No.: US 7,191,698 B2
(45) Date of Patent: Mar. 20, 2007

(54) SYSTEM AND TECHNIQUE FOR ULTRASONIC DETERMINATION OF DEGREE OF COOKING

(75) Inventors: Leonard J. Bond, Richland, WA (US); Aaron A. Diaz, W. Richland, WA (US); Kayte M. Judd, Richland, WA (US); Richard A. Pappas, Richland, WA (US); William C. Cliff, Richland, WA (US); David M. Pfund, Richland, WA (US); Gerald P. Morgen, Kennewick, WA (US)

(73) Assignee: Battelle Memorial Institute, Richland, WA (US)

( * ) Notice: Subject to any disclaimer, the term of this patent is extended or adjusted under 35 U.S.C. 154(b) by 414 days.

(21) Appl. No.: 10/406,993

(22) Filed: Apr. 3, 2003

(65) Prior Publication Data

US 2004/0195231 A1 Oct. 7, 2004

(51) Int. Cl.
*A23L 1/00* (2006.01)

(52) U.S. Cl. .......................................... 99/330; 99/451

(58) Field of Classification Search ................ 426/237; 99/451, 330, 331

See application file for complete search history.

(56) References Cited

U.S. PATENT DOCUMENTS 3,636,859 A * 1/1972 Null ............................ 99/348
4,049,938 A 9/1977 Ueno
4,384,476 A 5/1983 Black et al.
4,467,164 A 8/1984 Nakata et al.
4,568,201 A 2/1986 Noda
4,734,553 A 3/1988 Noda
4,751,356 A 6/1988 Fukuda et al.
4,831,239 A 5/1989 Ueda
4,868,357 A 9/1989 Serikawa et al.
5,060,507 A 10/1991 Urmson et al.
5,096,725 A 3/1992 Kim
5,132,914 A 7/1992 Cahlander et al.
5,180,600 A 1/1993 Hsieh et al.
5,181,778 A 1/1993 Beller
5,293,019 A 3/1994 Lee
5,303,708 A 4/1994 Stouffer
5,387,254 A 2/1995 Matsushima
5,530,229 A 6/1996 Gong et al.

(Continued)

FOREIGN PATENT DOCUMENTS

EP 1068522 12/2000

OTHER PUBLICATIONS

Jewish Cooking. Feb. 24, 1999. http://web.archive.org/web/19990224050147/http://www.jewfaq.org/food.htm.*

(Continued)

*Primary Examiner*—Timothy F. Simone
(74) *Attorney, Agent, or Firm*—Klarquist Sparkman, LLP

(57) ABSTRACT

A method and apparatus are described for determining the doneness of food during a cooking process. Ultrasonic signal are passed through the food during cooking. The change in transmission characteristics of the ultrasonic signal during the cooking process is measured to determine the point at which the food has been cooked to the proper level. In one aspect, a heated fluid cooks the food, and the transmission characteristics along a fluid-only ultrasonic path provides a reference for comparison with the transmission characteristics for a food-fluid ultrasonic path.

21 Claims, 5 Drawing Sheets

U.S. PATENT DOCUMENTS

| | | | | |
|---|---|---|---|---|
| 5,589,209 A | | 12/1996 | Mizrach et al. | |
| 5,689,060 A | | 11/1997 | Matsushima | |
| 5,693,247 A | | 12/1997 | Bu et al. | |
| 5,702,626 A | | 12/1997 | Kim | |
| 5,744,786 A | | 4/1998 | Kim | |
| 5,762,609 A | | 6/1998 | Benaron et al. | |
| 6,077,552 A | * | 6/2000 | Chimenti et al. | 426/231 |
| 6,155,160 A | | 12/2000 | Hochbrueckner | |
| 6,299,920 B1 | | 10/2001 | Saksena | |

OTHER PUBLICATIONS

Arielle's Recipe Archive. Dec. 21, 2001. http://web.archive.org/web/20011221224208/http://www.fortunecity.com/meltingpot/belgium/1029/frieddough.html.*

David Julian McClements, "Ultrasonic Characterization of a Food Emulsion" *Ultrasonics, IPC Science and Technology Press Ltd,* vol. 28, No. 4, Jul. 1, 2990, pp. 266-272.

David Julian McClements, "Ultrasonic NDT of Foods and Drinks" *International Advances in NDT,* vol. 17, pp. 63-83.

Soong et al. "Ultrasonic Characterization of Slurries in an Autoclave Reactor at Elevated Temperatures" U.S. Department of Energy, 1996.

Wilbur A. Gould, Ph. D., "Unit Operations for the Food Industries" CTI Publications, Feb. 1996, pp. 75-78.

Soong et al. "Ultrasonic measurement of solids concentration in an autoclave reactor at high temperature" *Chemical Engineering Journal,* 1997, pp. 175-180.

Schultz et al. "Ultrasonic propagation in metal power-viscous liquid suspensions" Acoustical Society of America, 1997, pp. 1361-1369.

Nielsen et al. "Low Frequency Ultrasonics for Texture Measurements in Cooked Carrots (*Daucus carota* L.)" Journal of Food Service, 1997. pp. 1167-1175.

Heldman et al. "Principles of Food Processing" Chapman & Hull, 1997, pp. 39-42.

Soong et al. "Ultrasonic Characterizations of Slurries in a Bubble Column Reactor" American Chemical Society, 1999, pp. 2137-2143.

Mizrach et al. "Nondestructive ultrasonic detemination of avocado softening process" *Journal of Food Engineering,* 1999, pp. 139-144.

Flitsanov et al. "Measurement of avocado softening at various temperatures using ultrasound" *Postharvest Biology and Technology,* 2000, pp. 279-286.

Mulet et al. "Noninvasive Ultrasonic Measurements in the Food Industry" *Food Reviews International,* vol. 18, 2002, pp. 123-133.

Llull et al. "Evaluation of textural properties of a meat-based product (sobrassada) using ultrasonic techniques" *Journal of Food Engineering,* 2002, pp. 279-285.

Llull et al. "The use of ultrasound velocity measurement to evaluate the textural properties of sobrassada from Mallorca" *Journal of Food Engineering,* 2002, pp. 323-330.

Benedito et al. "Application of low intensity ultrasonics to cheese manufacturing processes" *Ultrasonics,* 2002, pp. 19-23.

* cited by examiner

SYSTEM AND TECHNIQUE FOR ULTRASONIC DETERMINATION OF DEGREE OF COOKING

GOVERNMENT RIGHTS

This invention was made with Government support under Contract Number DE-AC0676RL01830 awarded by the U.S. Department of Energy. The Government has certain rights in the invention.

FIELD OF THE INVENTION

The present invention relates generally to a method and apparatus for determining the degree of doneness of food during a cooking process and, more particularly, to a method and apparatus for determining doneness of food using ultrasonic monitoring techniques.

BACKGROUND

A common cooking process involves immersing food to be cooked in a heated fluid, most commonly water, oil or steam. One form of this cooking process is blanching, for example, which typically refers to the immersion of the food in heated water and is a common technique for partially cooking, among other things, vegetables prior to freezing or canning. Blanching is conventionally used as a form of precooking to inactivate or arrest enzymes from attacking a food to cause it to discolor, become changed in texture, or lose flavor. Blanching softens some foods, like asparagus and decreases the volume of foods like spinach, thus permitting proper packaging. Blanching is also used for fruits and vegetables to remove the off-flavors, expel the occluded air, set the color, improve the texture, and cleanse the product.

With potatoes, for example, blanching destroys enzyme activity, leaches out reducing sugars that can cause discoloration, and improves texture. Proper blanching, however, requires that the food be cooked to a particular level of doneness. Accurately determining the proper doneness level is difficult, however, since for a given type of food the size, moisture content, consistency, and shape can all contribute to the time required for the cooking process. Again with potatoes, for example, characteristics such as sugar content can vary with cultivar, growing conditions and storage environment, thereby increasing the complexity of determining the desired level of doneness during the blanching operation.

Unfortunately, the ability to rapidly, reliably, and efficiently monitor the degree of cooking of foods in a non-invasive manner without the need for constant monitoring by trained individuals is limited. Accordingly, it is an object of the present invention to provide improved systems and techniques for monitoring cooking using ultrasonic techniques that increase the degree of automation and thereby reduces costs.

SUMMARY OF THE INVENTION

It is an object of the present invention to provide a novel technique for determining the degree of doneness of food as it is being cooked. It is to be understood that as used herein, doneness refers to the degree of completion of a particular cooking operation, including but not limited to blanching, and does not require that the cooking operation be the final cooking operation. For example, as described above, blanching is typically a type of pre-cooking operation, with future further cooking contemplated. In one aspect the food to be monitored is immersed in a container of heated fluid such as water or steam. At least two ultrasonic transducers are acoustically associated with the container of fluid as an opposed pair with the food to be monitored disposed between the transducers. Ultrasonic signals are transmitted through the food and fluid mixture by the first transducer and received by the second transducer. The transmissiveness of the ultrasonic signals through the food is measured to determine the degree of doneness. In one application the transmissiveness of the signals through the food is determined by correcting a value determined from a signal that passes through the food fluid mixture with a value extracted from the substantially simultaneous measurement of an acoustic property of the fluid.

Still other objects and advantages of the present invention will become readily apparent to those skilled in this art from the following detailed description, wherein only certain embodiments of the invention are shown and described, simply by way of illustration of the best mode contemplated of carrying out the invention. As will be realized, the invention is capable of modifications in various obvious respects, all without departing from the invention. Consequently, the drawing and description are to be regarded as illustrative in nature, and not as restrictive.

DESCRIPTION OF EMBODIMENTS

Figure 1:
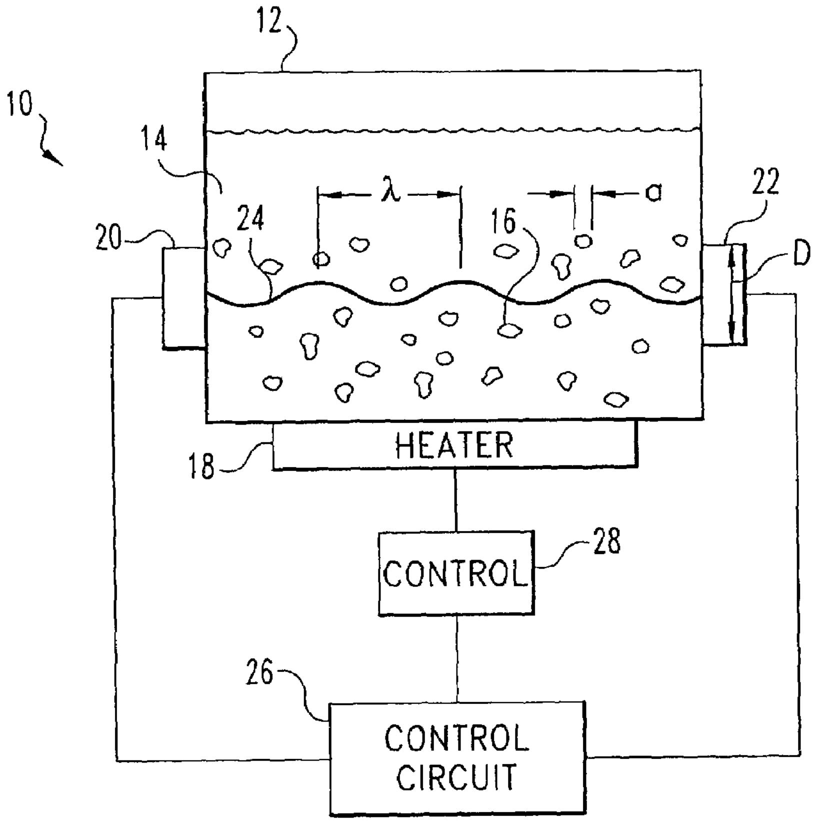
FIG. 1 is a schematic diagram of a cooking monitoring arrangement in accordance with an aspect of the present invention.

For the purposes of promoting an understanding of the principles of the invention reference will now be made to the embodiments illustrated in the drawings and specific language will be used to describe the same. It will nevertheless be understood that no limitation of the scope of the invention is thereby intended. Any alterations and further modifications in the illustrated embodiments, and any further applications of the principles of the invention as illustrated herein are contemplated as would normally occur to one skilled in the art to which the invention relates.

FIG. 1 shows a cooking arrangement 10 that illustratively includes a cooking vessel or container 12 containing a cooking medium or fluid 14, but the invention is equally applicable to an arrangement in which the cooking fluid flows through a pipe or conduit. Fluid 14 is typically water, oil or steam, but may be other fluids that are designed to cook foods by immersing the food in a heated fluid or passing the heated fluid over the food so that cooking is done by contacting the food with the heated fluid. Located within the fluid-containing container 12 is a quantity of food 16 that is to be cooked. Food 16 may be a variety of foods that are effectively cooked by immersion in heated fluid, including vegetables such as potatoes and carrots, rice or grains, and corn as examples. Fluid 14 is heated by a heater 18, which may be of conventional design, such as a gas burner or electric coil.

In accordance with an aspect of the invention, an ultrasonic transducer 20 is located adjacent and in acoustic contact with container 12. A second ultrasonic transducer 22 is located on the opposite side of and in acoustic contact with container 12. Transducers 20 and 22 are configured in a bistatic or pitch-catch arrangement in that transducer 20 transmits a predetermined sequence of ultrasonic signals, illustratively shown as signal 24, and transducer 22 receives signal 24. An exemplary signal is a tone-burst signal or other short pulse, such as would be generated via a spike or square wave input to a transducer, though longer duration or substantially continuous signals could also be used. As described more fully below, pulse compression techniques and/or digital signal processing can be employed to achieve a high signal to noise ratio and an accurate determination of, for example, the group velocity. Alternatively or in addition, signal averaging, for example over between 100–1000 pulses, can be employed as would occur to those of skill in the art.

Transducers 20 and 22 can be single frequency or multi-frequency transducers, i.e. those having the capability of operating at different frequencies or ranges of frequencies. As described more fully below, advantages can be realized through the use of at least two different frequencies, which can be achieved in a variety of ways, for example by using multiple single frequency transducer pairs or a single pair of dual frequency transducers. The transducers are placed such that food 16 will be located within the path of the transmitted ultrasonic signal 24.

Without intending to be bound by any particular theory of operation, the technical basis for the concept of the invention can be described as follows. The characteristics of an acoustic, i.e., ultrasonic, wave propagating through a fluid-solids suspension depend on the physical properties of both the fluids and solids in combination, in this case the food for which doneness is to be measured. The wave speed, energy loss, and frequency content are three commonly measured characteristics that depend on the physical mechanical and thermodynamic properties of the food. The interaction of the sound wave with the food is strongly dependent on the wavelength of the sound wave. For wavelengths that are large compared to the dimensions of the food (e.g., individual rice grains), a coherent pulse propagating through the food is sensitive to changes in density, compressibility and viscosity. These physical properties contribute to the food texture attributes. An expression for the sonic velocity can be written:

$$V = \frac{1}{\sqrt{\kappa_{eff} \times \rho_{eff}}} \tag{3}$$

where κeff is the effective compressibility and ρeff is the effective density of the volume of the food. The measurement of sonic velocity through a volume of food can be related to these parameters and would account for both the physical properties of the food and the physical properties of the voids between the food, e.g. between rice grains. For large wavelengths relative to the dimensions of the food, the energy loss can be attributed to dissipation, as opposed to scattering, and can be estimated by measuring the amplitude changes of the coherent pulse or wave as a function of frequency. In a general sense, the energy dissipation can be written:

$$\alpha_{dissipation} \approx f^n \times \frac{[g(\eta) + h(\tau)]}{\rho \times v^3} \tag{2}$$

where f is the frequency, ρ is the density, υ is the sonic velocity, g(η) is a function of viscosity, h(τ) is a function of thermal conductivity and n is a frequency dependent power law, typically in the range of 2–4. For shorter wavelengths that approximate the dimensions of the food, the energy loss is mostly due to scattering. In this case, an incoherent (loss of phase coherence) sonic diffusivity measurement is made. The packing of the food, such as the stickiness of rice grains for example, will contribute to losses in the propagating sound wave. An expression for the diffusivity measurement can be written:

$$\langle E(z, t)\rangle \approx E_0 \times \frac{e^{-z^2/D\times t}}{\sqrt{D \times t}} e^{-\sigma\times t} \tag{3}$$

where <E(z,t)> is the average sonic energy density as a function of propagation distance and time, D is the sonic diffusivity, and σ is the dissipation. The diffusivity measurement is used in conjunction with the coherent sonic measurements previously described. The combination of measurements of sonic velocity, dissipation and diffusivity can together form a robust set of property attributes for classifying the state of doneness for a volume of food.

In the embodiment shown in FIG. 1, the output from transducer 22 is applied to feedback and control circuitry 26, which monitors, for example, the acoustic velocity and attenuation of the transmitted signal 24 through food 16. One manner of monitoring is to cross-correlate the received signal with the transmitted signal. Feedback and control circuitry 26 controls various aspects of the transmission of signals from transducer 20 to transducer 22, including, for example, the timing, duration, and frequency of the transmitted signal 24. Feedback and control circuitry 26 is also calibrated to determine, based, for example, on the measured acoustic velocity and signal attenuation, when the desired level of doneness of food 16 has been achieved. Once feedback and control circuitry 26 determines that food 16 has been cooked to the desired level of doneness, feedback and control circuitry 26 may sound an alarm as an alert to indicate the food has been properly cooked, terminate the cooking process by turning off the heater 18 via heater control 28, activate process controls (not shown) that physically remove the food 16 from the container 12, or any combination of the foregoing.

Figure 2:
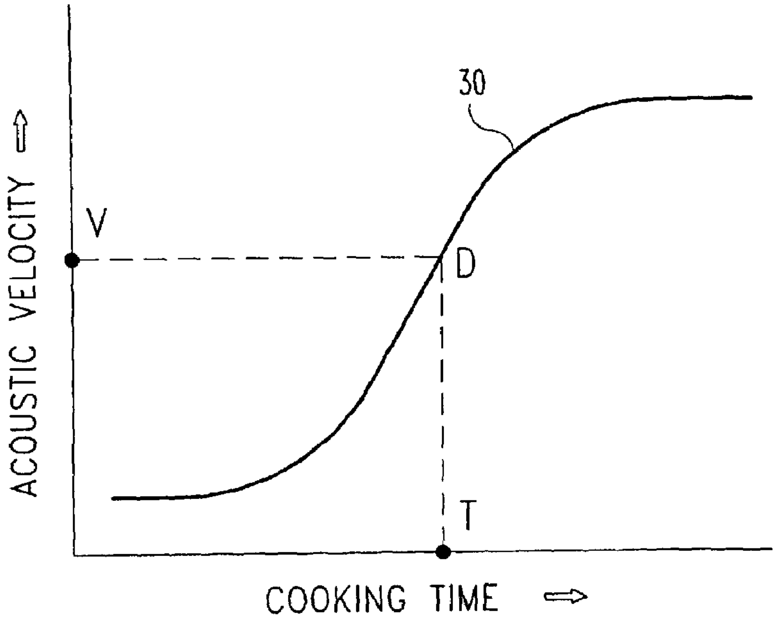
FIG. 2 is a graph illustrating one characteristic of ultrasonic transmissiveness through, food during cooking.

As indicated above, feedback and control circuitry 26 may provide an indication of food doneness based on a variety of criteria. One such criteria is the propagation speed or acoustic velocity, e.g., time of flight of the ultrasonic signal 24 from transducer 20 to transducer 22, of the transmitted ultrasonic signals. FIG. 2 shows a representative graph of ultrasonic signal acoustic velocity through a representative sample of food as a function of cooking time. As can be seen, the propagation speed of the ultrasonic signal increases as cooking of the food progresses. The graph of FIG. 2 is intended to show the general relationship between acoustic velocity and cooking time, and is not intended to show any particular function. The individual characteristics of a particular function will be determined by a number of factors, including the type of food (composition), the size of the food pieces within the heated fluid, the temperature of the fluid, the fluid-solid volume fraction, and the frequency of the ultrasonic signals. In general however, the signal velocity versus cooking time function will follow the characteristics of that shown in FIG. 2.

The manner in which the function shown in FIG. 2 provides the means to determine food doneness can be described, in a simplified way, as follows. For a given type of food having generally uniformly sized pieces, such as French fries for example, testing may determine that the desired degree of doneness occurs at a point D on function curve 30, as shown on FIG. 2. The desired degree of doneness may be determined by the specific application. For example, blanching time for French fries for home microwave oven preparation may be somewhat different than the cooking time imparted to French fries that are being prepared for shipment to fast food restaurants, which typically prepare French fries differently than do consumers at home. Once the appropriate doneness characteristics, such as texture, extent of gelatinization, temperature, and density, are determined so that point D may be accurately located on curve 30, the corresponding acoustic velocity V can be specified. This information can be used to program the functionality of feedback and control circuitry 26 to accurately monitor the cooking progress and provide some form of notification when the desired degree of doneness has been achieved, including the removal or deactivation of the heater 18.

The acoustic velocity V of FIG. 2 is representative of changes in the acoustic velocity through the food 16. However, in FIG. 1 for example, the parameter directly measured is the acoustic velocity through the mixture of food 16 and fluid 14 between transducers 20, 22. The acoustic velocity through the food 16 is extracted from the time of flight for the combined food/fluid path by assuming that the distance traveled through each medium, fluid 14 and food 16, is proportional to the respective volume fraction. Accordingly, the acoustic velocity in the food 16 can be extracted from a direct measurement of the time of flight through the mixture via equation (4)

$$\text{Time of Flight}=d[(1-\phi)/V_{fluid}+\phi/V_{food}] \quad (4)$$

where d is the sound path length; $\phi$ is the volume fraction of food; $V_{fluid}$ is the acoustic velocity in the fluid; and $V_{food}$ is the acoustic velocity in the food. The volume fraction of the food, $\phi$, and the acoustic velocity of the fluid, $V_{fluid}$, can each be independently measured or approximated.

One mechanism for selecting a value for $V_{fluid}$ is through prior calibration or otherwise predetermined relationships with a measured or known property of the fluid 14, for example its temperature or the concentration of a particular constituent, such as sugar or starch. Variations described more fully below in connection with FIGS. 5–8 provide for the substantially simultaneous measurement of $V_{fluid}$. These variations provide a mechanism to account for changes in $V_{fluid}$ as a function of cooking time that reduce or eliminate the need to approximate a value for $V_{fluid}$ or to otherwise rely on prior calibration.

Although point D on curve 30 of FIG. 2 also occurs at a nominal cooking time duration T, the previously described food cooking monitoring means 10 provides much better control over the cooking process than does a fixed cooking time. As the described method directly measures characteristics of the food itself, differences in the temperature of the fluid 14 or the physical properties of the food 16 do not affect the accuracy of the measurement or monitoring process.

Figure 3:
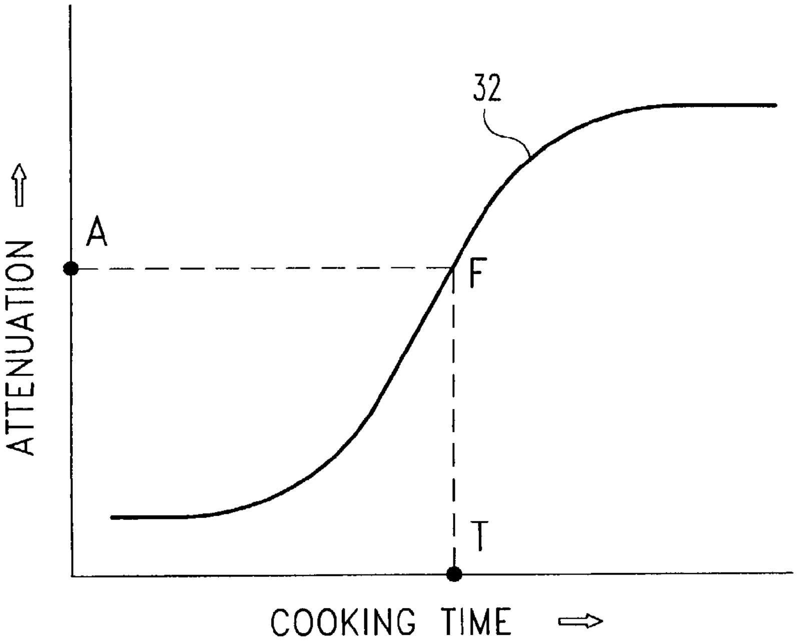
FIG. 3 is a graph illustrating another characteristic of ultrasonic transmissiveness through food as a function of cooking time.

Another characteristic that can be used by feedback and control circuitry 26 to measure food doneness is the attenuation of the signal by the food. The degree of attenuation will change along with the change in physical properties of the food during the cooking process, as is illustratively shown in FIG. 3. The graph in FIG. 3 is also merely a representation of the general change in signal attenuation as a function of cooking time or duration, and does not represent any particular type of food or process. As described above, the actual graphical function will be affected by the type and nature of the food being cooked, as well as the wavelength (i.e., frequency) of the ultrasonic signals. In a manner similar to that used to determine doneness for the function shown in FIG. 2, feedback and control circuitry 26 monitors the increase in attenuation of the ultrasonic signal as the food cooks. By experimentation it is known that the desired doneness occurs at point F on attenuation curve 32, which corresponds to an attenuation identified as A, for example. When this level of doneness is reached, i.e., attenuation level A has been achieved, circuitry 26 may alert the user, terminate the cooking process by turning off heater 28, activate process controls (not shown) that physically remove the food 16 from the container 12, or any combination of the foregoing. As described above with respect to equation 4, the attenuation across the combined fluid/food path can also be resolved into components for the fluid 14 and for the food 16 via a weighted average based on volume fraction.

The measurements of acoustic velocity and attenuation may be used in conjunction to determine the level of food doneness. As described above, transducers 20 and 22 can be configured to operate in two frequency ranges. The frequency range will also depend on container size and may, in general range from about 10 to 500 kHz. In one application a lower range of the order of about 10–25 kHz was used for measurement of acoustic velocity and dissipation, and a higher frequency range of the order of about 35–125 kHz was used for measurement of sonic diffusivity (e.g., attenuation). The selection of frequency will depend on the particular application and the food being monitored.

One consideration for the selection of frequency is the characteristic dimension of the food particles 16, denoted as "a" in FIG. 1. Where k is the wavenumber, defined as $2\pi/\lambda$ where $\lambda$ is the wavelength of the ultrasound in the fluid suspension, the value of ka should be less than 10, more preferably less than 5, or less than 2. A typical range might be between 0.2 and 5.

The size of the active element of the transducers 20 and 22 are also selected based on a characteristic dimension a of the food. Where D is the largest dimension of the active element of the transducer (i.e. the diameter of a round transducer or the largest side of a rectangular transducer), D should be on the order of or greater than a, more preferably D is at least about 2*a*, for example in the range of 4*a* to 8*a*, and can be larger for small particles in suspension, such as with a grain.

In selecting the size of the transducer, the relevant characteristic dimension of the food particles can be chosen to be the dimension encountered across the direction of ultrasound propagation (see direction of dimension a illustrated in FIG. 1). For a well mixed mixture where particles assume a variety of configurations, this dimension is approximated with an average value for irregularly shaped particles. Alternatively, if irregularly shaped or high aspect ratio particles would be preferentially oriented in one direction, such preferential orientation can be taken into account to define the relevant dimension. In one aspect, where food particles are irregular and preferentially oriented, the transducers are arranged such that transmitted ultrasound traverses a shorter dimension of the food particles. For example, if monitoring the blanching of a basket of french fries, the transducers can be arranged with the operative face of the transducers generally parallel to the elongated axis of the fries.

In expected applications, where the cooking medium is water and the food is of typical sizes expected to be encountered, it is expected that an appropriate low frequency range can be about 15 kHz–25 kHz for cut vegetables, about 18 kHz–25 kHz for rice, and about 10 kHz–12 kHz for grains such as cereal. It is expected that an appropriate high frequency range can be about 35 kHz–50 kHz for cut vegetables, about 45 kHz–100 kHz for rice, and about 35 kHz–65 kHz for grains. The two measurements, a low frequency measurement and a high frequency measurement, are combined and analyzed to determine the degree of food doneness by way of the signal processing of feedback and control circuitry 26 in the embodiment of FIG. 1.

Figure 9:
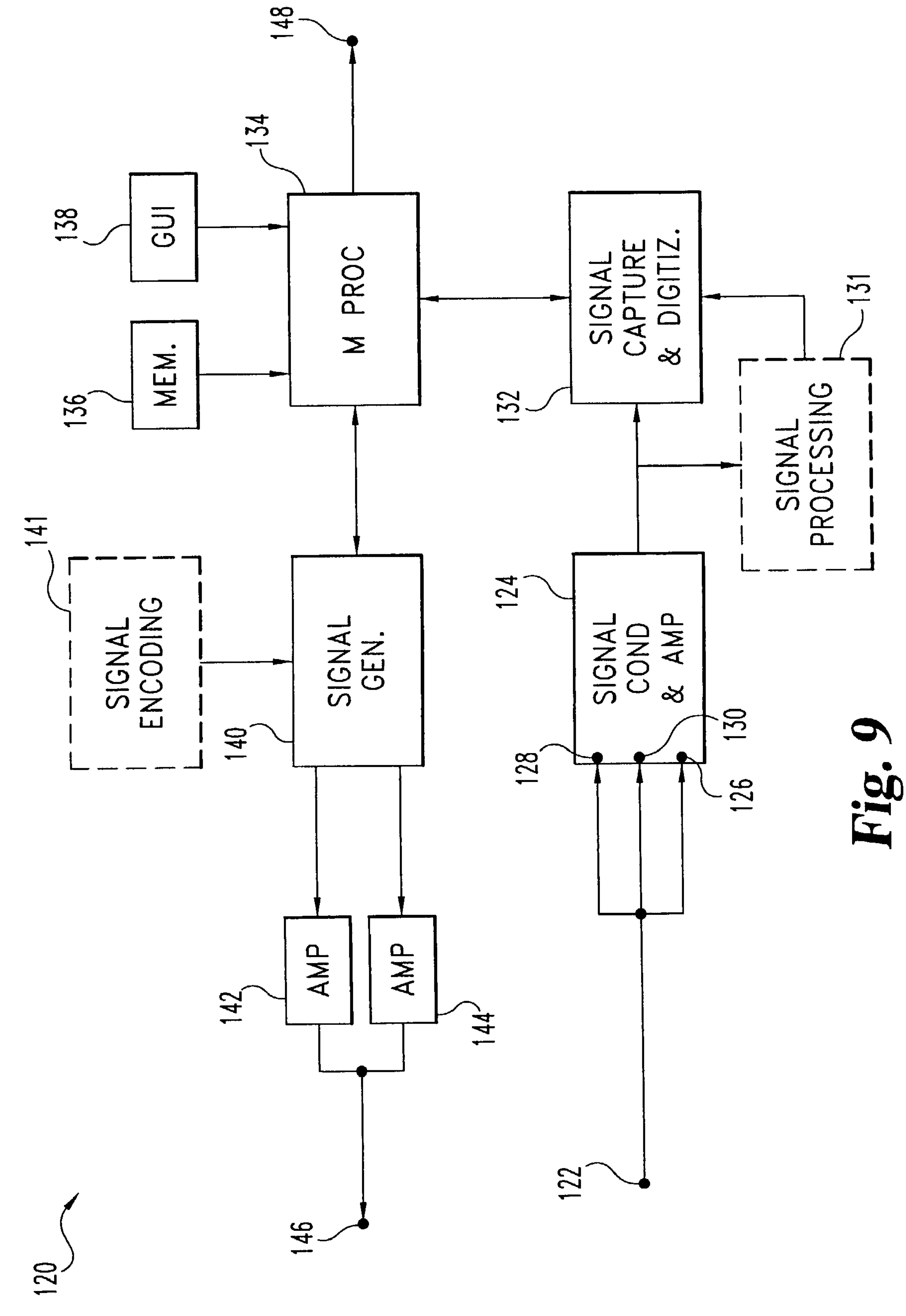
FIG. 9 is a block diagram of a control circuit for determining doneness of food.

An illustrative example of circuitry that could perform the function of circuitry 26 is shown in FIG. 9. The circuitry 120 shown in FIG. 9 receives a signal from a receiving transducer, such as transducer 22, for example, at input 122. The signal at input 122 is applied to signal conditioning and amplifying circuit 124. Circuit 124 is configured to receive a variety of signals, including both lower frequency signals illustratively received at input 126 and higher frequency ultrasonic signals illustratively received at input 128, as well as signals indicative of temperature and pressure illustratively received at input 130. The output of circuit 124 is applied to signal capture and digitization block 132, which interfaces with microprocessor 134 or other processing device. Microprocessor 134 could also take the form of a laptop computer. Operatively associated with microprocessor 134 is a memory block 136 which stores the algorithm (which may include a calibrated correlation database or library) which determines the proper doneness level based on the signals from the transducers. Also associated with microprocessor 134 is circuit 138 which creates a graphical user interface for the cooking arrangement.

Microprocessor 134 provides an output which is applied to a programmable signal generator 140 whose output is amplified by audio amplifier 142 and ultrasonic amplifier 144 and applied to the transmitting transducer (not shown) via output 146. Microprocessor 134 also generates an output 148 indicative of the desired degree of food doneness that may be used to control the operation of the cooking heater, sound an alarm or signal indicating that the food has been cooked to the desired level of doneness, activate process controls that physically remove the food from the container or any combination of the foregoing.

In one variation, signal pulse compression methods are applied to optimize the signal-to-noise and the time-of-flight resolution. These signal pulse compression methods are illustratively represented by the optional signal encoding 141 and signal processing blocks 131 of FIG. 9. For example, the transmitted signal may incorporate a predetermined range of frequencies, for example taking the form of a sine wave with continuously varying frequency conventionally referred to as a broadband frequency sweep. This approach uses a signal of wide bandwidth and long duration, a technique that is often used in radar applications, for example. The received signal is then cross correlated with the transmitted signal to determine the time of flight. The cross correlation of the received signal with the transmitted signal results achieves a high signal to noise ratio and provides an accurate transmit signal arrival time.

An alternative pulse compression technique is the use of amplitude modulation to digitally encode a signal on a carrier frequency. In one application of this technique a distinctive binary phase shift modulated tag is digitally encoded in each pulse to uniquely identify its source transmitter. Such unique identification is particular useful in embodiments that utilize a multitude of transmitters and receivers. An analog, heterodyne receiver may be used to remove the high frequency carrier signal. This setup allows measurements to be made rapidly without resorting to extremely high speed digitization. The carrier signal may also be removed in software code using digital signal processing techniques directly on the received signals. As with other pulse compression techniques, the cross correlation of the received signal with the transmitted signal results in mostly signal contributions related to the encoded information and very little contributions from random, or white noise in the received signal, providing relatively high signal to noise and accuracy. Further details of pulse compression techniques useful in obtaining accurate and reliable information in the present invention can be found in Gan, T. H., Hutchins, D. A., Billson, D. R., and Schindel, D. W., "The use of broadband acoustic transducers and pulse-compression techniques for air-coupled ultrasonic imaging," *Ultrasonics* 39, 181–194 (2001); and Lam, F. K., and Hui, M. S., "An ultrasonic pulse compression system for non-destructive testing using minimal-length sequences," *Ultrasonics*, p. 107–112 (1982).

Food products monitored during blanching can severely attenuate the acoustic signal. For example, the steam blanching of corn is a food system that severely attenuates the acoustic signal. Also, for some food products small changes in acoustic time-of-flight can be related to significant changes in blanch state. In some cooking vessels and configurations, multiple transmitters and receivers are utilized. For instance, as described more fully below, advantages can be realized by simultaneous measurements of different beam paths, for example to provide a system that has a degree of self-calibration. The use of pulse compression methods can be employed for one or more of these situations in embodiments of the present invention.

Figure 4:
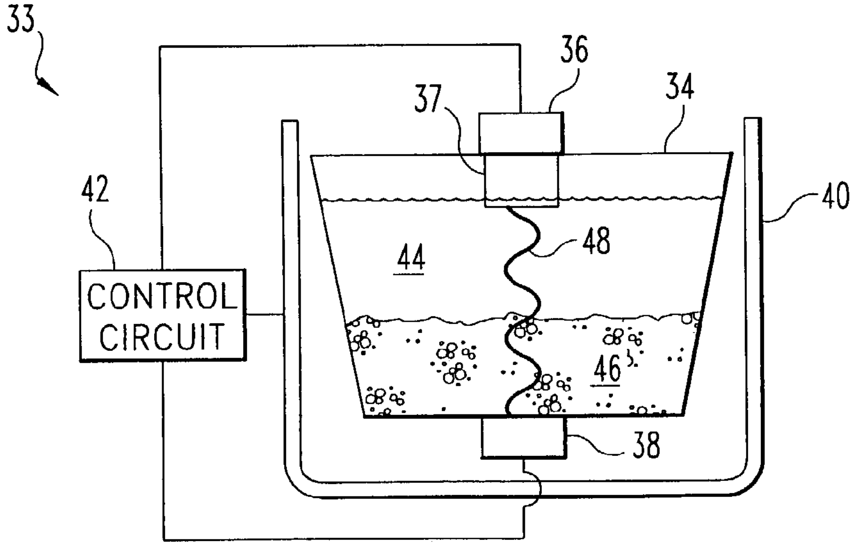
FIG. 4 is a schematic diagram of a cooking arrangement in accordance with another aspect of the present invention.

FIG. 4 shows an alternate embodiment of a cooking arrangement 33 in which the position of the ultrasonic transducers are positioned above and below the cooking vessel or container 34. This arrangement of ultrasonic transducers 36 and 38 may be more appropriate or easier to implement than that shown in FIG. 1, for example, depending upon the nature of the food being cooked or the type of cooking container that is used. FIG. 4 also shows a heating structure 40 that surrounds the cooking container 34 and circuitry 42 that controls the functions of both transducers 36 and 38, and heating structure 40. Container 34 contains fluid 44, such as water or oil, and a quantity of food 46 to be cooked. Transmitting transducer 36 emits an ultrasonic signal 48, which may be a series of pulses or a continuous signal, at a single frequency or at multiple, different frequencies. As previously described, different frequencies may be desirable for improving the accuracy of certain measurements. For example, the ultrasonic frequency that results in the most desirable acoustic velocity measurement function may occur at a frequency that is different than that needed to obtain the desired attenuation measurement.

FIG. 4 also shows the use of a buffer rod 37 between the transducer 36 and the fluid 44. The use of a buffer rod 37 prevents direct contact between the transducer 36 and the fluid 44, which can help to preserve the life of the transducer by providing distance from a potentially harsh environment. The separation provided by buffer rod 37 also allows for temperature variations between the transducer 36 and the fluid 44, for example if it is desirous to keep the transducer at a temperature below the fluid temperature. The use of a buffer rod 37 can optionally be employed with any of the transducers of the present invention, whether in contact with the fluid or the sides of the container.

Figure 5:
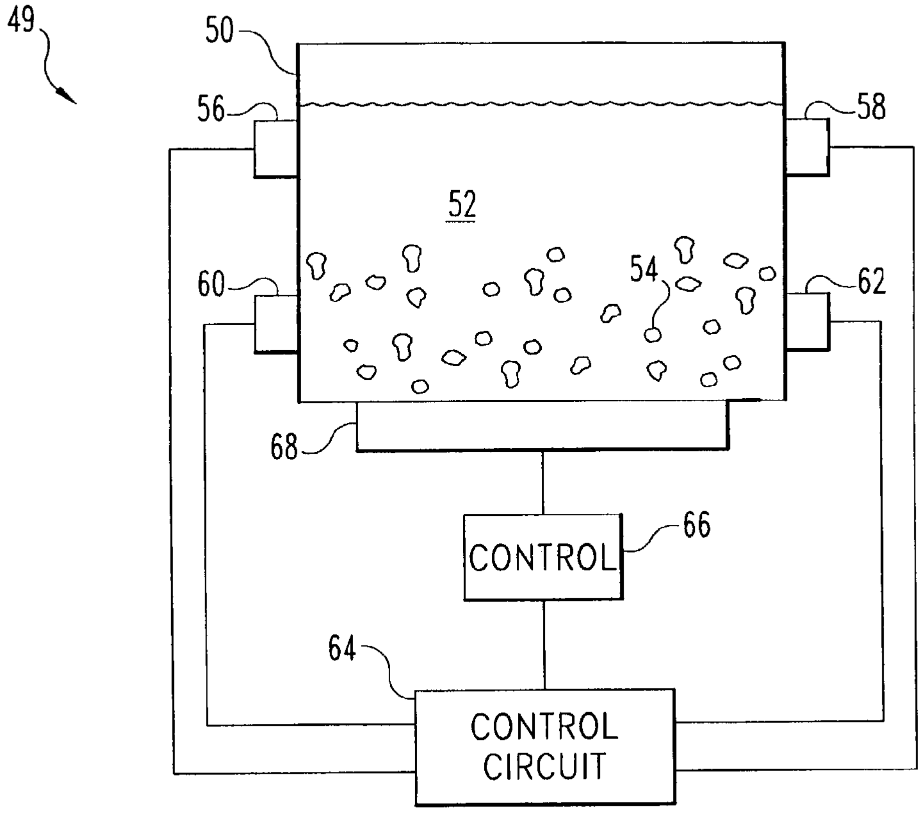
FIG. 5 is a schematic diagram of another cooking arrangement in accordance with an aspect of the present invention.

In commercial cooking operations, in which the degree of doneness from batch to batch must be extremely uniform and consistent, it may be desirable to provide a means for accounting for any variations in acoustic velocity or attenuation of the ultrasonic signals due to the cooking fluid or medium. Such variations attributable to the cooking medium include, by way of example, disruptions of the signal caused by boiling, temperature changes, or changing dissolved solids concentration (starch for example) or overall composition of the fluid as a result of the cooking process (for example as portions of the food dissolve into the fluid). Such variations due to interferences may be accounted for by providing a reference based on the ultrasonic transmissiveness of the cooking fluid itself that can be used to accurately adjust or calibrate the cooking and monitoring apparatus. FIG. 5 shows one example of a cooking arrangement 49 that provides such a reference.

In cooking arrangement 49 of FIG. 5, cooking container 50 contains a cooking fluid 52 and a quantity of food 54 to be cooked. In accordance with an aspect of the present invention, a first pair of ultrasonic transducers 56 and 58 and a second pair of ultrasonic transducers 60 and 62, are disposed adjacent to, and on opposite sides of, the cooking container 50. Transducers 56 and 58 are positioned near the top of container 50 such that ultrasonic signals transmitted from transducer 56 to transducer 58 pass through fluid 52 but not through any significant amount of food 54, which tends to stay near the bottom of container 50. Transducers 60 and 62 are positioned such that ultrasonic signals transmitted from transducer 60 to transducer 62 substantially pass through food 54. Circuitry 64 is operatively connected to all transducers such that any variation in acoustic velocity or attenuation of the ultrasonic signals caused by transmission through the cooking fluid 52 can be accounted or compensated for in the calibration of circuitry 64. In a manner similar to that shown in FIG. 1, circuitry 64 also controls heater control 66 which operates the heater 68 for container 50.

Figure 6:
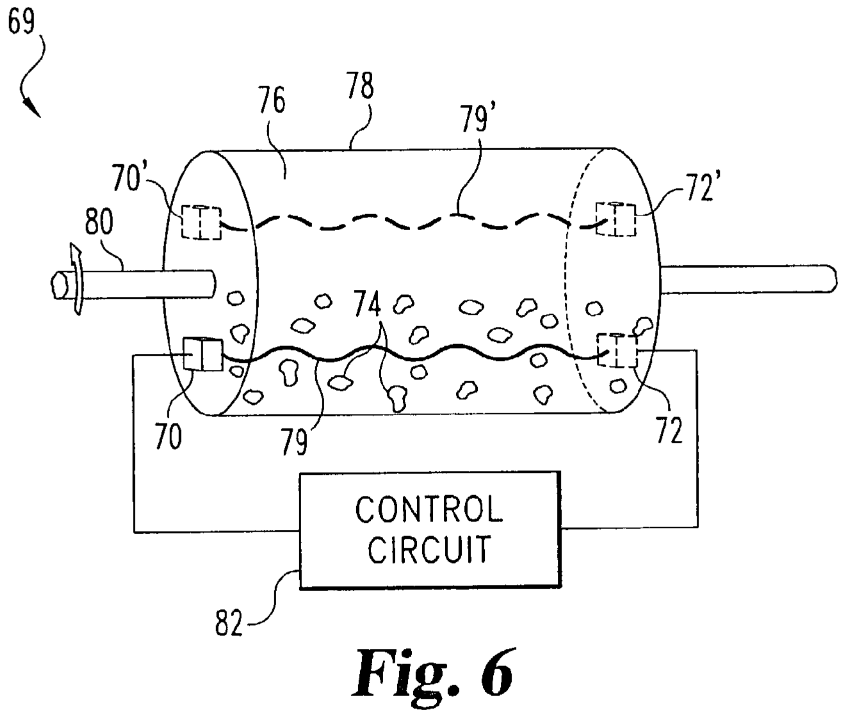
FIG. 6 is a schematic diagram of a further cooking arrangement in accordance with an aspect of the present invention.

FIG. 6 illustrates an alternate embodiment of a cooking apparatus 69 in which a single pair of transducers 70 and 72 can provide both measurement of the extent of the doneness of food 74 as well as a reference based on any variations that might occur in the transmission of ultrasonic signals through the cooking fluid 76. In accordance with an aspect of the present invention, a cooking container 78, on which transducers 70 and 72 are mounted, rotates along its longitudinal axis around shaft 80. Container 78 can be a drum type cooker where the longitudinal axis is generally horizontal. Cooking of the food can be accomplished, for example, by passing a cooking fluid, such as steam or heated air, vertically through small flow holes (not shown) provided in the walls of container 78. A rotating drum type cooker may be useful for cooking grains or cereals where continual stirring is desired. Food 74 remains in the lower portion of container 78 during its rotation, while transducers 70 and 72 rotate with container 78. In that way, transducers 70 and 72 are positioned during one portion of the rotation of container 78 such that ultrasonic signals 79 transmitted from transducer 70 to transducer 72 passes through food 74, and during another portion of the rotation of container 78, transducers 70 and 72, shown in FIG. 6 as 70' and 72', are positioned so that transmitted ultrasonic signal 79' substantially passes only through cooking fluid 76 (which substantially fills the container 78), thereby providing means for generating a reference signal. Transducers are operatively connected to control circuitry 82 which, based on the measurements taken, determines the point at which the desired doneness of the food occurs. The rotating transducers are electronically connected to the control circuitry via either wireless communications technology or mechanical slip rings.

Figure 7:
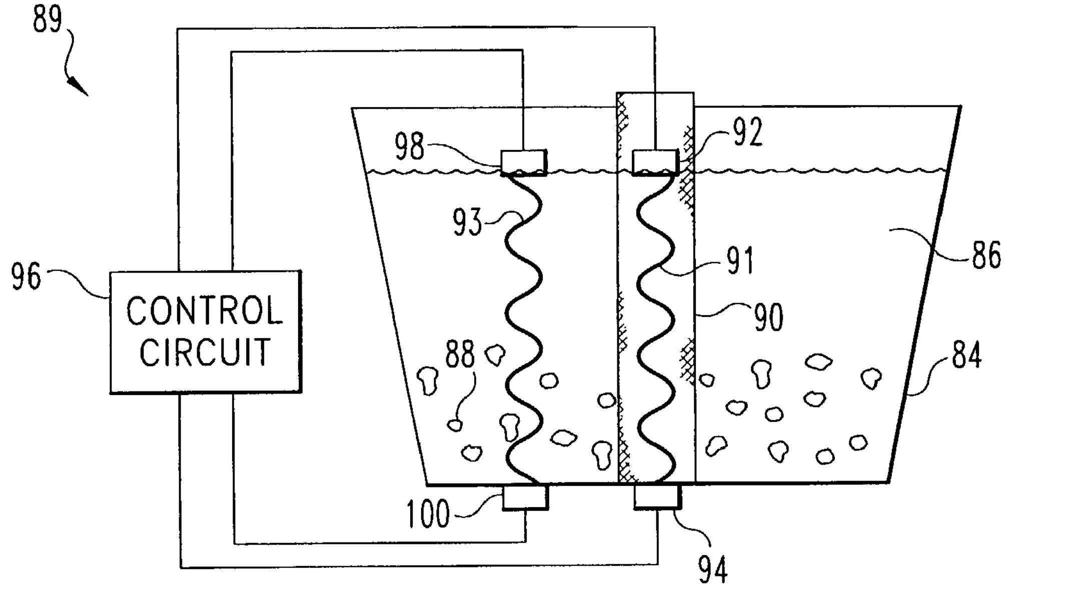
FIG. 7 is a schematic diagram of a different cooking arrangement in accordance with an aspect of the present invention.

FIG. 7 illustrates still another embodiment of a cooking apparatus 89 for ultrasonic measurement of food doneness. In FIG. 7 there is shown a container 84 in which is contained cooking fluid 86 and a quantity of food 88. Located within container 84 is a cylinder 90, which may be manufactured from a wire mesh or screen material, for example, which is permeable to cooking fluid 86, but not to food 88. The cylinder 90 functions to create an acoustic path within the interior of the cylinder 90 that includes representative cooking fluid 86 but is maintained substantially free of food. A pair of transducers 92 and 94 are located within or adjacent to cylinder 90 such that ultrasonic signals 91 transmitted from transducer 92 to transducer 94 (or vice versa) pass through cooking fluid 86 within cylinder 90 but do not pass through food 88, thereby permitting transducers 92 and 94 to generate a reference signal. This reference signal is applied to circuitry 96. A second pair of transducers 98 and 100 are located and disposed adjacent to container 84 such that ultrasonic signals 93 transmitted by transducer 98 and received by transducer 100 (or vice versa) pass through food 88, thereby permitting measurement of food doneness as previously described. The arrangement described in FIG. 7 can be used, for example, in a situation in which the food to be cooked does not remain in one portion of the container during cooking or in other situations where it may not be practical to position transducers so that ultrasonic signals only pass through the cooking fluid or medium.

Figure 8:
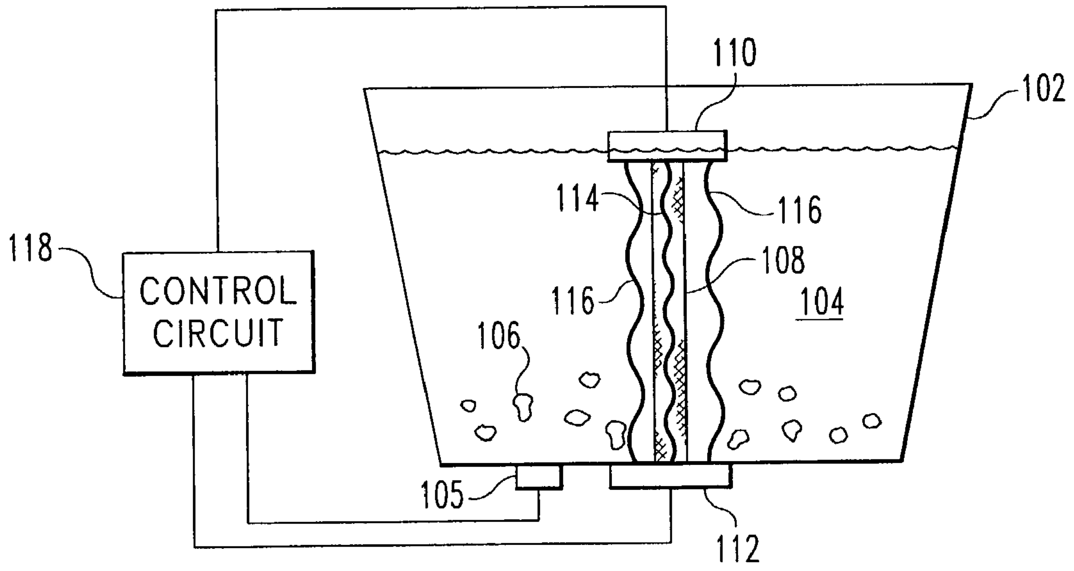
FIG. 8 is a schematic diagram of a variation of the cooking arrangement shown in FIG. 7.

FIG. 8 illustrates an embodiment of the present invention in which a single pair of transducers can be used to both measure doneness characteristics of food and generate a reference signal simultaneously. In an apparatus similar to that shown in FIG. 7, for example, vessel or container 102 contains a cooking fluid 104 and a quantity of food 106 to be cooked. The fluid is heated to a temperature sufficient to cook the food by a heater 105. Disposed within container 102 is a tube or screen 108 that is permeable to fluid 104 but not to food 106. Located at opposite ends of tube 108 are ultrasonic transducers 110 and 112. Portions of transducers 110 and 112 are located to lie within the confines of tube 108 and portions of transducers 110 and 112 lie outside the confines of tube 108. For that reason, during transmission of ultrasonic signals from transducer 110 to transducer 112, for example, a portion 114 of the ultrasonic signal will remain within the confines of tube 108 and only pass through fluid 104. The other portion 116 of the ultrasonic signal will be located outside of tube 108 and will pass through fluid 104 and food 106. Control circuitry 118 is operatively connected to transducers 110 and 112 and receives the signal from transducer 112. Because of differences in acoustic velocity between the two acoustic paths, the fluid only path and the food-fluid path, the transmission of a single pulse signal will be received at the receive transducer as a pair of pulses, one delayed from the other. Circuitry 118 determines the difference between the propagation speed or acoustic velocity of the ultrasonic signal through food 106 and through fluid 104 to determine the velocity characteristic as a function of the cooking time of food 106 in order to ascertain the desired degree of doneness of food 106 and terminate cooking by disabling heater 105, for example.

Additional information regarding the degree of doneness of the food can be derived by collecting backscattering measurements. These backscattering measurements can be recording utilizing the same or different transducers are used for obtaining the transmissiveness data described above. For example, 180 degree backscattering data can be collected by utilizing the same transducer (for example transducer 22 in FIG. 1) as both the transmitter and receiver and collecting the ultrasonic response as a function of time after a pulse excitation. This 180 degree backscattered response will have information relating to the scattering properties of the food fluid mixtures, and like the transmissiveness properties of the food fluid mixture monitored in the techniques described above, the scattering properties are expected to change as the food is cooked. Differences in ultrasonic scattering can be used to determine the degree of doneness of food. Off angle scattering data can also be used by providing a transducer aligned at an off angle with the interrogation axis of a transmitter.

While the invention has been illustrated and described in detail in the drawings and foregoing description, the same is to be considered as illustrative and not restrictive in character. Only certain embodiments have been shown and described, and all changes, equivalents, and modifications that come within the spirit of the invention described herein are desired to be protected. Any experiments, experimental examples, or experimental results provided herein are intended to be illustrative of the present invention and should not be considered limiting or restrictive with regard to the invention scope. Further, any theory, mechanism of operation, proof, or finding stated herein is mean to further enhance understanding of the present invention and is not intended to limit the present invention in any way to such theory, mechanism of operation, proof, or finding. Thus, the specifics of this description and the attached drawings should not be interpreted to limit the scope of this invention to the specifics thereof. Rather, the scope of this invention should be evaluated with reference to the claims appended hereto. In reading the claims it is intended that when words such as “a”, “an”, “at least one”, and “at least a portion” are used there is no intention to limit the claims to only one item unless specifically stated to the contrary in the claims. Further, when the language “at least a portion” and/or “a portion” is used, the claims may include a portion and/or the entire items unless specifically stated to the contrary. Finally, all publications, patents, and patent applications cited in this specification are herein incorporated by reference to the extent not inconsistent with the present disclosure as if each were specifically and individually indicated to be incorporated by reference and set forth in its entirety herein.

What is claimed is:

1. An apparatus for monitoring the degree of doneness of food comprising:

a vessel, which, in use, contains a fluid and a quantity of food disposed in the fluid;

means for heating said fluid to cook said food;

first and second ultrasonic transducers acoustically associated with said vessel wherein ultrasonic signals transmitted by said first ultrasonic transducer pass through at least a portion of said fluid and said food and are then received by said second ultrasonic transducer; and a processing device operable to receive an output from said second ultrasonic transducer representative of said signal received by said second ultrasonic transducer, wherein said output exhibits at least one transmission characteristic of said received signal which varies as a function of the doneness of said food;

wherein the processing device is further operable to determine a first value corresponding to the doneness of said food from the received output and a value corresponding to an ultrasonic characteristic of the fluid.

2. The apparatus described in claim 1, wherein said fluid includes water.

3. The apparatus of claim 1 wherein ka is less than about 2, where a is a characteristic dimension of the food and k is the wavenumber of the ultrasound received by the second transducer defined as $\pi/\lambda$.

4. The apparatus described in claim 1, wherein said fluid includes cooking oil.

5. The apparatus described in claim 1, wherein said fluid includes steam.

6. The apparatus described in claim 1, wherein said transmission characteristic is the acoustic velocity of said ultrasonic signal.

7. The apparatus described in claim 1, wherein said transmission characteristic is the attenuation of said ultrasonic signal.

8. The apparatus described in claim 1, wherein said processing device is operable to receive a signal representing ultrasonic signals which pass through said fluid along an acoustic path substantially devoid of said food for forming a reference signal representative of the ultrasonic characteristic of the fluid.

9. The apparatus described in claim 8, wherein said reference signal is received by one of said first or second transducers.

10. The apparatus of claim 8 wherein ka is less than about 5, where a is a characteristic dimension of the food and k is the wavenumber of the ultrasound received by the second transducer defined as $\pi/\lambda$.

11. The apparatus of claim 10 wherein at least one the first and second transducers has a characteristic dimension D and D/a is greater than about 2.

12. The apparatus described in claim 1, wherein said vessel and said first and second ultrasonic transducers are movable relative to said fluid and said food such that for at least a period of time said ultrasonic signal passes through said fluid along an acoustic path substantially devoid of said food.

13. The apparatus described in claim 12, wherein the vessel and the first and second ultrasonic transducers are rotatable about an axis extending through the vessel such that for at least a period of time said ultrasonic signal passes through said fluid along an acoustic path substantially devoid of said food.

14. The apparatus of claim 1 wherein said transducers are selectively operable to transmit and receive ultrasound through at least a portion of said food at a plurality of different ultrasonic frequencies.

15. An apparatus for monitoring the degree of doneness of food comprising:

means for heating said food to a temperature sufficient to cook said food;

first and second opposed ultrasonic transducers positioned on opposite sides of the vessel from each other, acoustically associated with said food wherein ultrasonic signals transmitted by said first ultrasonic transducer pass through at least a portion of said food and are then received by said second ultrasonic transducer; and a processing device operable to receive an output from said second ultrasonic transducer representative of said signal received by said second ultrasonic transducer, wherein said output exhibits at least one transmission characteristic of said received signal which varies as a function of the doneness of said food, wherein the processing device is further operable to determine a first value corresponding to the doneness of said food from the received output.

16. The apparatus described in claim 15, wherein said food includes vegetables.

17. The apparatus described in claim 15, wherein said food includes potatoes.

18. The apparatus described in claim 15, wherein said food includes rice.

19. The apparatus described in claim 15, wherein said food includes grain.

20. The apparatus of claim 15, wherein the processing device is operable to determine the first value corresponding to the doneness of said food from the received output and a value corresponding to an ultrasonic characteristic of a fluid in which the food is disposed.

21. An apparatus for monitoring the degree of doneness of food comprising:

a vessel;

a fluid contained in said vessel;

a quantity of food disposed in said fluid;

means for heating said fluid in said vessel to cook said food;

first and second ultrasonic transducers located adjacent to said vessel and positioned on opposite sides of said vessel from each other such that a portion of said fluid substantially without food lies between said first and second transducers;

third and fourth ultrasonic transducers located adjacent to said vessel and positioned on opposite sides of said vessel from each other such that a portion of said food lies between said third and fourth transducers; and a processing device operable to receive an output from said second ultrasonic transducer representative of the transmission characteristics through said fluid and to receive an output from said fourth ultrasonic transducer representative of the transmission characteristic through said fluid and said food, said processing device being operable to process said output signals from said second and said fourth transducers to obtain a signal which exhibits at least one transmission characteristic of said food and not said fluid.

* * * * *